United States Patent Office 3,280,264

Patented Oct. 18, 1966

3,280,264

TIME MULTIPLEX TELEPHONE SYSTEM

Dieter Von Sanden, Munich-Solln, and Max Schlichte, Munich, Germany, assignors to Siemens & Halske Aktiengesellschaft, Berlin and Munich, Germany, a corporation of Germany Filed Mar. 29, 1963, Ser. No. 269,206
Claims priority, application Germany, Apr. 3, 1962, S 78,801
7 Claims. (Cl. 179—15)

Figure 1:
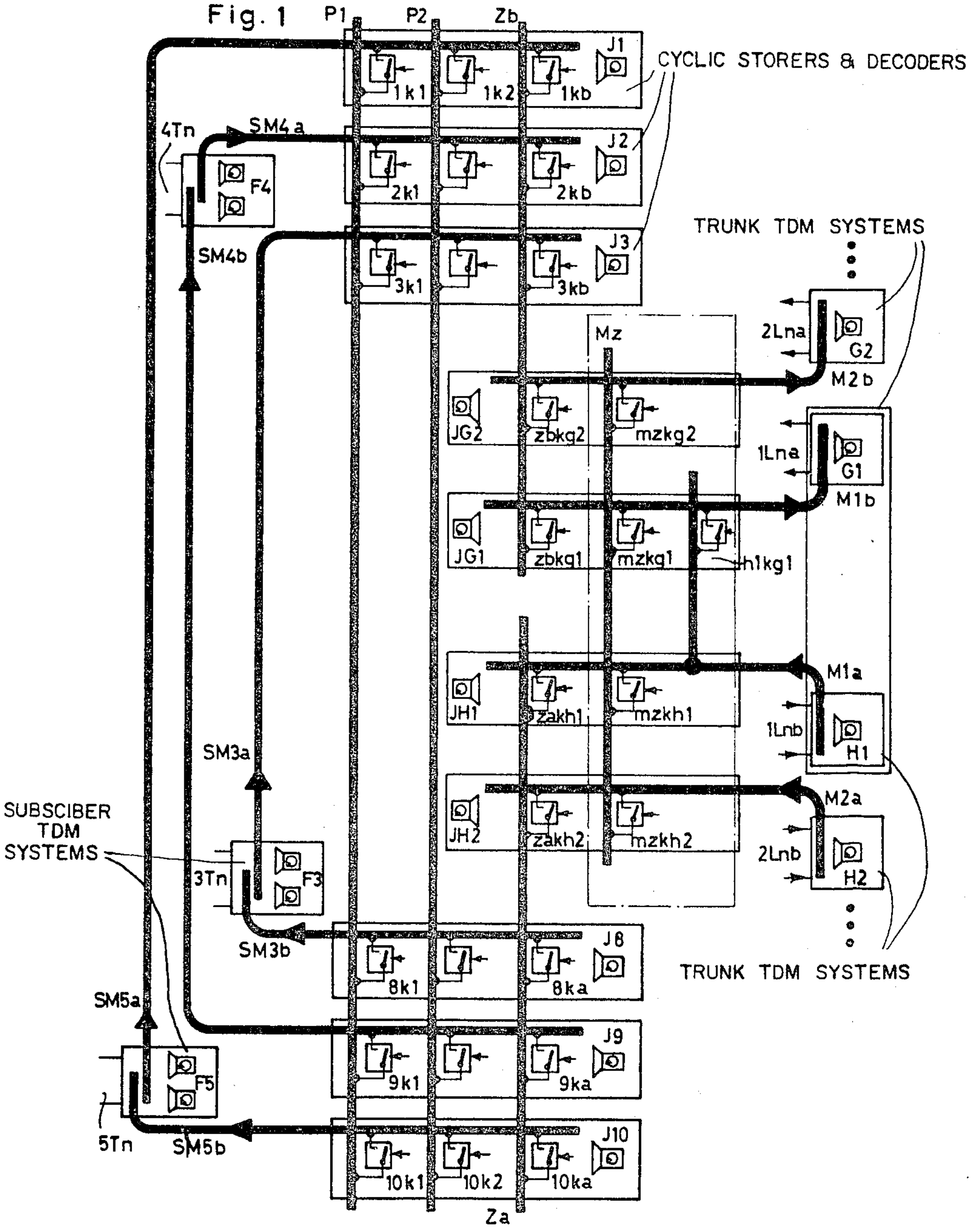

The invention disclosed herein relates to a time multiplex telephone system and is particularly concerned with a circuit arrangement for use in connection with a time multiplex telephone system of the type described in copending application Serial No. 210,406, filed July 17, 1962, which is owned by the assignee named in the present case.

The copending application is concerned with a circuit arrangement over which is conducted the traffic of a plurality of time multiplex telephone systems which are respectively provided with a telephone multiplex line for conducting calls incoming to subscriber stations as well as with a telephone multiplex line for conducting calls outgoing from subscriber stations, the subscriber stations of the respective systems being periodically impulse-wise connected with these multiplex lines by means of call or speed switches. The corresponding circuit arrangement is constructed as a coupling multiple, also referred to as a cross wire coupling multiple, to the line or row conductors of which are respectively connected the individual multiplex lines for outgoing calls and the multiplex lines for incoming calls, thus making it possible to extend, by way of the column conductors, calls within and between the time mutiplex telephone systems, by connecting a respective time multiplex line for outgoing calls with a time multiplex line for incoming calls, the respective calls being extended by impulse-wise closure of coupling point contacts connected at the corresponding column conductors and line conductors; further column conductors being provided which cross respectively only line conductors with multiplex lines for outgoing calls or line conductors with multiplex lines for incoming calls, these further column conductors being utilized for extending calls outgoing to other exchanges and calls incoming from such other exchanges, which is accomplished by impulse-wise closure of coupling point contacts connected to these further column conductors and line conductors. In the embodiment of such a circuit arrangement, shown in FIG. 3 of the above noted copending application, the multiplex lines for the systems with lines respectively outgoing to and incoming from other exchanges, are directly connected with further column conductors.

Such a circuit arrangement according to the copending application is advantageous, especially when the incoming and outgoing traffic between the lines leading to other exchanges and the subscribers of the time multiplex systems which are by the circuit arrangement combined in one exchange, is relatively heavy. This will be the case, particularly when only lines are connected to the further time multiplex systems, having trunk lines extending to other exchanges, which actually extend to other exchanges, whereby these lines are to be connected practically only with subscribers of the time multiplex systems, while a through traffic between different such extraneous exchanges occurs only relatively rarely.

The present invention is concerned with a further development of the circuit arrangement according to the prior application, in which the multiplex lines of the time multiplex systems with lines respectively outgoing to and incoming from other exchanges, are not fixedly connected to the previously mentioned further column conductors.

The invention is accordingly concerned with a circuit arrangement over which is conducted the traffic of a plurality of time multiplex telephone systems having respectively a multiplex line for calls incoming to the subscribers as well as a multiplex line for calls outgoing from the subscribers, to which the respective subscriber stations involved in calls, are periodically impulse-wise connected by means of speech or call switches, which arrangement is in accordance with the prior application constructed as a coupling or cross wire multiple, to the line conductors of which are respectively connected individual time multiplex lines for outgoing calls and the multiplex lines for incoming calls, so as to make it possible to conduct over the column conductors the traffic within and between time multiplex telephone systems, by respectively connecting a time multiplex line for outgoing calls with a time multiplex line for incoming calls, by impulse-wise closure of coupling point contacts connected to the corresponding column and line conductors, and wherein further column conductors are provided which are respectively disposed in crossing relationship only with line conductors connected with multiplex lines for outgoing calls or line conductors connected with multiplex lines for incoming calls, over which further column conductors can be extended calls outgoing to other exchanges and the like and incoming therefrom, respectively, such extension of calls being effected by periodic impulse-wise closure of coupling point contacts connected to these further column conductors and line conductors.

The particular feature of this circuit arrangement resides in that to such a further column conductors, which crosses only line conductors connected with multiplex lines for outgoing calls, are connected in common auxiliary coupling point contacts, respectively with one terminal thereof, which coupling point contacts are with the other terminal thereof individually connected to multiplex lines of time multiplex systems connected with lines leading to other exchanges or the like, instead of to subscriber stations, and in that such a further column line which crosses only line conductors with multiplex lines for incoming calls, is connected with one terminal in common with auxiliary coupling point contacts which are, with the other terminal thereof individually connected with multiplex lines of time multiplex communication systems having trunk lines incoming from other exchanges or the like instead of from subscriber stations.

The circuit arrangement according to the invention is particularly of advantage in cases in which the traffic between the time multiplex telephone systems and the further time multiplex communication systems with trunk lines outgoing to other exchanges or the like, or incoming therefrom, is relatively slight. This is the case, for example, when not only lines respectively for outgoing or incoming calls are connected to such further time multiplex communication systems, which trunk lines do not only lead to other exchanges, but also lines of special subscribers and the like which are not connected to one of the usual time multiplex telephone systems of the respective exchange, or when a more or less extensive through-traffic between the trunk lines incoming from other exchanges and outgoing to other exchanges, must be coped with. The circuit arrangement according to the invention will then require only a relatively small number of coupling points for the traffic between the time multiplex systems and the further time multiplex systems with trunk lines extending respectively for incoming and outgoing calls to other exchanges and the like, since connections of desired combinations between a time multiplex system with lines leading to or incoming from other exchanges, can be extended over such further column conductors, thus eliminating the need for column conductors and associated coupling points beyond the number thereof which is required for carrying on the traffic between the time multiplex telephone systems and the further time multiplex communication systems having trunk lines leading to other exchanges.

Further details and features of the invention will appear from the description which is rendered below with reference to the accompanying drawings.

Figure 2A:
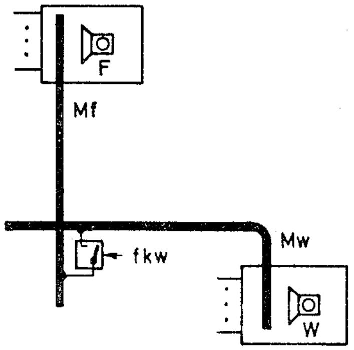
Figure 2B:
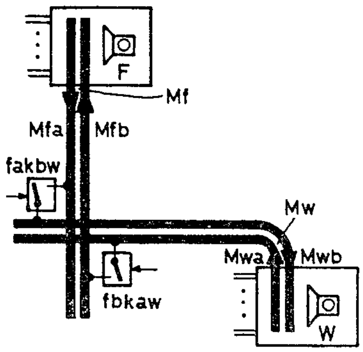
Figure 3:
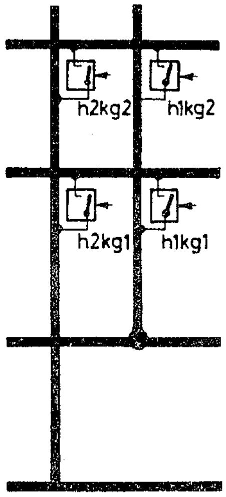

FIG. 1 shows essential parts of the circuit arrangement also shown in FIG. 3 of the previously noted copending application so as to indicate the principles involved in the construction of the corresponding circuit arrangement;

FIGS. 2*a* and 2*b* indicate different structures of coupling point contacts; and FIG. 3 shows a circuit portion which may in a given case be substituted for the portion shown in FIG. 1 within the dot-dash rectangle.

The circuit arrangement shown in FIG. 1 is constructed as a cross wire coupling multiple. The coupling point contacts are arranged in crossing field fashion in lines and columns and are line-wise and column-wise multipled. Thus, the coupling point contacts **1*k*1 . . . 1*kb* are arranged in a line or row of the coupling field multiple, each contact being with one terminal thereof connected with the corresponding line conductor. The other terminals of the contacts are individually connected with column conductors disposed in perpendicular crossing relationship with the respective line conductor. The contacts 1*k*1 . . . 10*k*1** lying along a column conductor are analogously connected, each with one terminal with the respective column conductor and with the other terminal individually with a line disposed in crossing relationship with the column conductor. Coupling point contacts are in similar manner connected with the remaining line conductors and column conductors. A line conductor can thus be connected with a column conductor by closure of a given coupling point contact; two line conductors can be connected with a column conductor by closing two coupling point contacts connected to the same column conductor.

To the line conductors are connected the time multiplex lines . . . SM3*a*, SM3*b* . . . SM5*a*, SM5*b* . . . of time multiplex telephone systems . . . F3 . . . F5. . . . To these time multiplex systems are connected groups of subscribers . . . 3T*n* . . . 5T*n* for which the calls are extended by the circuit arrangement described in the copending application.

In addition to the column conductors P1, P2, over which is conducted the traffic within and between the systems . . . F4 . . . , there are provided further column conductors which are respectively disposed in crossing relationship only with line conductors connected with lines for outgoing calls or with line conductors connected with lines for incoming calls, these further column conductors being indicated by Z*b* and Z*a*. Via these further column conductors are conducted the calls between subscribers of the systems . . . F3 . . . F5 . . . and the lines outgoing to other exchanges or incoming therefrom, which are respectively combined in line groups 1L*na* . . . 1L*nb*, connected to time multiplex communication systems G1 . . . H1, the respective calls being effected over coupling point contacts connected with the respective column conductors and line conductors. In the circuit arrangement according to FIG. 3 of the copending application, the multiplex lines M1*b* . . . M1*a* of the systems G1 . . . H1, having respectively trunk lines 1L*na* outgoing to other exchanges and trunk lines 1L*nb* incoming from other exchanges or the like, are directly connected with the further column conductors.

According to the present invention, which constitutes a further development of the prior circuit arrangement, there are provided, instead of such direct connections, auxiliary coupling point contacts which are apparent from FIG. 1. These auxiliary coupling point contacts are on the one hand, the contacts *zbkg*1, *zbkg*2 which are with one terminal thereof individually connected with the respective multiplex lines M1*b*, M2*b* . . . (of the time multiplex systems G1, G2 . . . having lines 1L*na*, 2L*na* outgoing to other exchanges), while being connected with the other terminal thereof to the further column conductor Z*b* which crosses only line conductors with multiplex lines . . . SM4*a* . . . for outgoing calls, and on the other hand, the contacts *zakh*1, *zakh*2 which are with one terminal individually connected with a multiplex line M1*a*, M2*a* . . . (of time multiplex systems H1, H2 . . . having lines 1L*nb*, 2L*nb* . . . incoming from other exchanges and the like), while being with the other terminal thereof connected to the further column conductor Z*a* which crosses only line conductors with multiplex lines . . . SM4*b* . . . for incoming calls. Accordingly, the first mentioned further column conductor Z*b* crosses the multiplex lines . . . SM4*a* . . . for outgoing calls of the systems . . . F4 . . . and the multiplex lines M1*b* . . . of the systems G1 . . . with lines 1L*na* . . . outgoing to other exchanges or the like, while the second mentioned further column conductor Z*a* crosses the multiplex line M1*a* . . . of the systems H1 . . . with lines 1L*nb* incoming from other exchanges and the like, and the multiplex lines . . . SM4*b* . . . for incoming calls of the multiplex systems . . . F4 . . . ; there being disposed at the crossing points the coupling point contacts . . . 2*kb* . . . and *zbkg*1 . . . as well as *zakh*1 . . . and . . . 9*ka* . . . , serving for establishing connections between the systems . . . F4 . . . and G1 . . . H1 . . . , having respectively lines for outgoing and incoming calls. Additional column conductors of this kind (not shown) may be provided if desired.

Calls between the time multiplex systems . . . F4 . . . and the time multiplex systems such as G1 . . . H1, which have trunk lines respectively for outgoing and incoming calls, leading to other exchanges and the like, are effected as follows:

For example, when a connection is to be established from a subscriber station of the subscriber group 5T*n* of the system F5 to a trunk line of the group 2L*na* of the system G2, the call switch of the respective subscriber in the subscriber group 5T*n* is by a control pulse periodically impulse-wise closed, thereby periodically connecting the corresponding subscriber with the multiplex line SM5*a* for outgoing calls. The control pulse which effects the operative closure of the call or speech switch has a definite phase position which is different from the phase positions of control pulses assigned to other subscribers for outgoing calls. The coupling point contact 1*kb* is also impulse-wise periodically closed, synchronously with the actuation of the call or speech switch assigned to the respective subscriber, thereby connecting the multiplex line SM5*a* with the column conductor Z*b*. The coupling point contact *zbkg*2 extending to the multiplex line M2*b* of the system G2, is closed at the same pulse phase. This results in an impulse-wise periodic connection between the multiplex line SM5*a* for outgoing calls of the system F5 and the multiplex line M2*b* of the system G2 having trunk lines 2L*na* leading to other exchanges or the like. The desired telephone connection is brought about by cycling the address of the desired line in the line group 2L*na*, in the cyclic storer of the system G2, thereby producing the control pulses for the actuation of the call or speech switches of the system, the resulting control pulse for the call or speech switch of the respective line, in the system G2, having the same phase position as the control pulse which governs the actuation of the call or speech switch of the calling subscriber in the time multiplex system F5.

It is understood, of course, that a plurality of telephone connections may be simultaneously present between the time multiplex system F5 and the system G2, it being merely necessary that the respective control pulses have different phase positions. These telephone connections can be extended via the same column conductor Zb without causing mutual interference. Likewise, connections between other pairs of lines from a time multiplex system F and a system G, having lines outgoing to other exchanges and the like, can be effected via the same column conductor Zb, provided, of course, that control pulses with different phase position are utilized. Upon providing a plurality of such column conductors, there may also be effected simultaneous telephone connections which are maintained by means of control pulses with identical phase position, provided that the respective connections are extended via different column conductors.

Connections between time multiplex systems H, having lines incoming from other exchanges or the like, and the time multiplex systems F, can be extended analogously via one of the further column conductors which crosses one of the respective multiplex lines. For example, a connection from a trunk line of the line group 1*Lnb* of the time multiplex system H1, to a subscriber of the subscriber group 5T*n* of the system F5 is extended by way of the multiplex line M1*a*, the coupling point contact *zakh*1, the column conductor Z*a*, the coupling point contact 10*ka* and the multiplex line SM5*b* for incoming calls of the time multiplex system F5. The call or speech switches here involved and also the two indicated coupling point contacts are of course to be synchronously periodically impulse-wise closed.

All desired connections between the circuit arrangement according to the invention and the extraneous exchanges or the like can be normally established in the above described manner. However, it might be desirable in given circumstances, to provide for further possibilities of establishing connections, so that lines, incoming from other exchanges or the like, which are connected with a time multiplex system H of the exchange which is being considered here, can be connected not only with subscribers of a system F of such exchange, but also with lines which extend from such exchange to other exchanges or the like, and which are connected to a system G of the exchange. This may be the case, for example, when all normal connection paths or channels between two extraneous exchanges are busy, while there are idle lines available which extend from the two extraneous exchanges to the exchange containing the circuit arrangement according to the invention.

In order to make such through connections possible, there are provided, in the coupling multiple according to the invention, as shown in FIG. 1, auxiliary coupling point contacts which are indicated at *mzkg*1 . . . *mzkh*1. . . . These coupling point contacts are with one terminal thereof connected with a special multiplex line Mz and with the other terminal individually respectively with a multiplex line M1*b* . . . M1*a* . . . of the multiplex system G1 . . . H1 . . . having trunk lines extending to other exchanges or incoming from such exchanges. Via these auxiliary coupling point contacts *mzkg*1 . . . and *mzkh*1 . . . and the special multiplex line Mz, can now be extended connections between a time multiplex communication system H1 . . . with trunk lines 1L*nb* . . . incoming from other exchanges, instead of subscriber lines, and a time multiplex system G1 . . . with trunk lines 1L*na* . . . outgoing to other exchanges, in a manner which is wholly in accordance with the above described operations concerning the extension of a connection between one of these time multiplex systems G or H and a time multiplex system F. For example, a connection from a line of the trunk line group 2L*nb* of the system H2 to a line of the trunk line group 1L*na* of the system G1, is extended via the multiplex line M2*a*, the coupling point contact *mzkh*2 and the multiplex line M1*b*, whereby the call or speech switches involved in the two communication systems H2 and G1, and the two respective coupling point contacts *mzkh*2 and *mzkg*1 are again synchronously impulse-wise periodically closed.

In the event that the traffic between a given time multiplex system H, having trunk lines L*nb* incoming from other exchanges, and a given time multiplex system G, having trunk lines L*na* outgoing to other exchanges, is sufficiently heavy to fully occupy a separate multiplex line Mz, it will be advantageous to provide in the coupling multiple auxiliary coupling point contacts and to connect such contacts with both terminals directly to the two multiplex lines of the two line multiplex systems having trunk lines incoming from other exchanges or trunk lines outgoing to other exchanges, respectively. In the coupling multiple according to FIG. 1, such a contact is the contact *h*1*kg*1 which is connected to the multiplex line M1*a* of the system H1 and to the multiplex line M1*b* of the system G1. The traffic between these two time multiplex systems H1 and G1 is in such case effected as follows:

The call or speech switch of a trunk line in the trunk line group 1L*nb*, which is involved in a given call, is in the system H1 again periodically impulse-wise closed, thus connecting the corresponding trunk line periodically with the multiplex line M1*a*. The coupling point contact *h*1*kg*1 is likewise periodically impulse-wise closed synchronously with the actuation of the respective call or speech switch, thus resulting in a connection between the multiplex lines M1*a* and M1*b*. The desired call is effected by cycling, at the same phase position, the address of the desired trunk line of the trunk line group 1L*na*, in the cyclic storer of the time multiplex system G1, so that the corresponding trunk line in the group 1L*na* is at such phase connected with the multiplex line M1*b*.

In the coupling multiple shown in FIG. 1, the coupling point contact *h*1*kg*1 is allocated to two definite time multiplex systems, namely, the systems H1 and G1. As already mentioned in the previously noted copending application, these systems can be combined in a pair, forming a combined time multiplex system which is provided with a multiplex line for outgoing calls as well as with a multiplex line for incoming calls. In FIG. 1, the two systems G1 and H1 are indicated as being included in such combination.

The circuit portion shown in FIG. 1 within the dot-dash rectangle can be replaced by an arrangement such as shown in FIG. 3. The coupling multiple will then have auxiliary coupling point contacts *h*1*kg*2 . . . *h*2*kg*1 which are respectively allocated to a combination pair of a multiplex line M1*a* . . . of a time multiplex system H . . ., having trunk lines 1L*nb* . . . incoming from other exchanges, and multiplex line M1*b* . . . of a time multiplex system G1 . . ., having trunk lines 1L*na* . . . outgoing to other exchanges. Such a construction of the circuit arrangement according to the invention is particularly advantageous in cases in which there are only few time multiplex systems having trunk lines respectively for incoming or outgoing calls, or in cases in which the traffic is in all respects between such time multiplex systems relatively heavy. The traffic between a line of a desired system H, having trunk lines incoming from other exchanges, and a line of a desired system G, having lines outgoing to other exchanges, is effected in the same manner as above described for the traffic between the system H1 and the ssytem G1 in which the connections are extended by way of the coupling point contact *h*1*kg*1, and further explanations with respect thereto are therefore omitted at this point.

A plurality of telephone connections may of course simultaneously exist between a time multiplex system H, having trunk lines incoming from other exchanges, and a time multiplex system G, having trunk lines outgoing to other exchanges, provided that the control pulses respectively allocated thereto, have different phase positions. Such telephone connections can be extended over one and the same coupling point contact, without entailing mutual interference. Lines assigned to other pairs of time multiplex systems H and G can likewise be interconnected at the same instant, since other coupling point contacts are to be actuated in such cases. Telephone connections can thereby simultaneously exist, which are maintained with the aid of control pulses of identical phase position, by merely complying with the requirement that they are extended by way of different multiplex lines.

Some explanations will now be given as to the manner in which the auxiliary coupling point contacts can be operatively actuated. Briefly stated, these coupling point contacts may be actuated with the aid of means such as are provided in the copending application for the actuation of the call or speech switches in the individual time multiplex systems. Thus, there may be provided, for example, special cyclic storers in which are cycled code signals assigned as addresses to the respective coupling point contacts, such cyclic storers serving for the production of the control pulses which effect the periodic impulse-wise closure of the respective coupling point contacts. Such cyclic storers may be allocated, for example, respectively to coupling point contacts of one and the same multiplex line of a time multiplex communication system for incoming or outgoing traffic, respectively. This is also indicated in FIG. 1, wherein devices JG1 . . . JH1 are in this manner assigned to the auxiliary coupling point contacts, such devices containing, respectively, a cyclic storer with a decoder and further, not illustrated parts. For example, the cyclic storer with decoder, of the device JG1, can have a plurality of outputs corresponding in number to the number of auxiliary coupling point contacts connected with the multiplex line M1b of the system G1, the respective coupling point contacts being operatively actuated via these outputs. Simultaneous actuation of several such coupling point contacts, connected to a multiplex line, is not effected, since different telephone connections would be interconnected thereby; accordingly, one cyclic storer suffices for the control of coupling point contacts connected to such a multiplex line. Coupling point contacts connected to the same column conductor such as *Za*, *Zb* or to the special multiplex line M*z*, are to be simultaneously actuated only when they are part of one and the same telephone connection. The cyclic storer forming part of the device JH1 is in similar manner allocated to the coupling point contacts which are connected with the multiplex line M1*a*, whereby coupling point contacts such as *h*1*kg*1 are connected with two multiplex lines (M1*a* and M1*b*), those coupling point contacts which had already been considered by a device, for example, JG1, requiring no further consideration.

A control of the coupling point contacts, by the cyclic storer, in different combination, is also possible. Thus, there may be provided, in place of cyclic storers for the actuation of coupling point contacts which are in a sense respectively disposed along line conductors, cyclic storers for the actuation of coupling point contacts which are disposed along respective columns.

It is understood, of course, that the coupling point contacts included in the circuit arrangement shown in FIG. 1, need not be constructed in the form of simple mechanical or electronic contacts, but that they may be constructed as two-wire or four-wire contacts, depending upon the technical requirements of a given system. In the case of a four-wire construction of the coupling point contacts, the condition must of course be met which requires, in connection with calls extended thereover between two time multiplex systems, each provided with a four-wire multiplex line, that the speech multiplex line of one of these systems is connected with the listening multiplex line of the other system, and vice versa, the speech multiplex line of the other system with the listening multiplex line of the first noted system. This shall be briefly explained with reference to FIGS. 2*a* and 2*b* showing in single-wire representation different structural possibilities for the coupling point contacts.

In FIG. 2*a* is indicated a two-wire coupling point contact *fkw* for interconnecting two mutually crossing two-wire multiplex lines M*f* and M*w* having lines extending to subscriber stations or to other exchanges or the like.

However, in the case of two mutually crossing four-wire multiplex lines of two such time multiplex systems, the coupling point contact is constructed as indicated in FIG. 2*b*. At the crossing point of the two four-wire multiplex lines, there are provided coupling point contacts *fakbw* and *fbkaw*, the first one of these contacts functioning to connect the speech multiplex line M*fa* of the time multiplex system F with the listening multiplex line M*wb* of the system W, and the second noted contact functioning to connect the speech multiplex line M*wa* of the system W with the listening multiplex line M*fb* of the system F.

Changes may be made within the scope and spirit of the appended claims which define what is believed to be new and desired to have protected by Letters Patent.

We claim:

1. In a circuit arrangement for extending connections between a plurality of time multiplex telephone systems having respectively a multiplex line for calls incoming to subscriber stations as well as a multiplex line for calls outgoing from subscriber stations, to which multiplex lines subscriber stations involved in calls are periodically impulse-wise connected with the aid of speech switches, said circuit arrangement being constructed as a cross wire coupling multiple having line conductors to which are individually connected multiplex lines for outgoing calls and the multiplex lines for incoming calls, and having column conductors disposed in crossing relationship with said line conductors and coupling point contacts arranged respectively at crossing points of line conductors and column conductors, whereby any given multiplex line for outgoing calls can be connected with a multiplex line for incoming calls by impulse-wise closure of coupling point contacts at the respective crossing points, so as to effect calls within and between the respective time multiplex telephone systems, and having further column conductors which are disposed in crossing relationship respectively only with line conductors connected with multiplex lines for outgoing calls or with line conductors connected with multiplex lines for incoming calls and further coupling point contacts arranged at the corresponding crossing points, whereby calls can be effected respectively outgoing to or incoming from other exchanges or the like, by impulse-wise closure of given further coupling point contacts; the improvement which comprises, auxiliary coupling point contacts connected with one terminal thereof in common with a given further column conductor which crosses only line conductors connected with multiplex lines for outgoing calls, the other terminal of said auxiliary coupling point contacts connected individually with multiplex lines of time multiplex systems to which are connected trunk lines outgoing to other exchanges or the like, and further auxiliary coupling point contacts connected with one terminal thereof in common with another further column conductor which crosses only line conductors connected with multiplex lines for incoming calls, the other terminal of said further auxiliary coupling point contacts connected individually with multiplex lines of time multiplex systems to which are connected trunk lines incoming from other exchanges or the like.

2. A circuit arrangement according to claim 1, comprising a special multiplex line, still further auxiliary coupling point contacts having one terminal thereof connected in common with said special multiplex line and the other terminal thereof individually connected to one of the multiplex lines of the time multiplex systems having trunk lines connected thereto which are respectively outgoing to or incoming from other exchanges and the like, said still further coupling point contacts serving by impulse-wise closure thereof to establish calls between the time multiplex systems having trunk lines incoming from other exchanges and time multiplex systems having trunk lines outgoing to other exchanges.

3. A circuit arrangement according to claim 2, comprising other further auxiliary coupling point contact means connected with multiplex lines of time multiplex systems formed by pair-wise combination of given time multiplex systems having respectively trunk lines incoming from or outgoing to other exchanges, said other further auxiliary coupling point contacts serving by impulse-wise closure thereof to establish calls extending via said combination of time multiplex systems.

4. A circuit arrangement according to claim 1, comprising auxiliary coupling point contact means allocated respectively to a combination formed of a multiplex line of a time multiplex system having trunk lines incoming from other exchanges and a multiplex line of a time multiplex system having trunk lines outgoing to other exchanges, said auxiliary coupling point contact means being connected with the respective multiplex lines and serving by impulse-wise closure thereof to establish calls extending via the respective time multiplex systems.

5. A circuit arrangement according to claim 3, wherein coupling point contacts which are connected with one and the same multiplex line are operatively controlled by code signals which are periodically cycled in a cyclic storer and serve as addresses for said coupling point contacts, whereby said other further coupling point contacts, which are connected with two multiplex lines, are for operative actuation considered only once.

6. A circuit arrangement according to claim 5, wherein said coupling point contacts which are connected with one and the same multiplex line are not simultaneously actuated.

7. A circuit arrangement according to claim 5, wherein coupling point contacts which are connected to one and the same column conductor and extend to different multiplex lines are simultaneously operatively actuated only when they are part of one and the same call.

References Cited by the Examiner

UNITED STATES PATENTS 3,204,033 8/1965 Adelaar ------------- 179—15

DAVID G. REDINBAUGH, *Primary Examiner.*

R. L. GRIFFIN, *Assistant Examiner.*